J. A. Bidwell,
Artificial Teeth.
No. 103,707. Patented May 31, 1870.
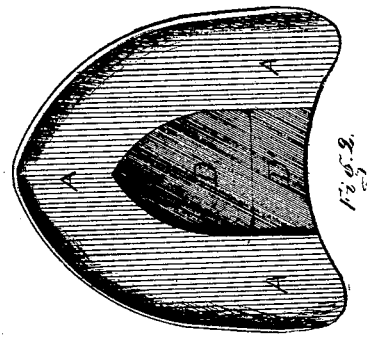
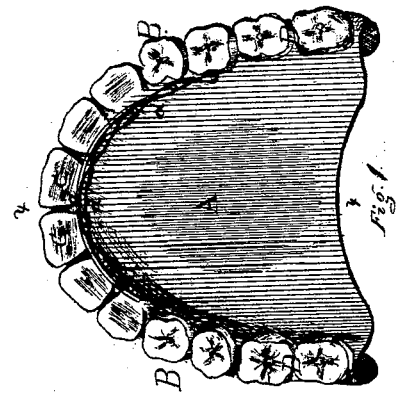
Witnesses:
C. N. Frost.
Wm. C. Farwell.
Inventor:
Julius A. Bidwell
By Farwell, Ellsworth & Co
Attorneys

United States Patent Office.

JULIUS A. BIDWELL, OF CHICAGO, ILLINOIS.

Letters Patent No. 103,707, dated May 31, 1870.

IMPROVEMENT IN ARTIFICIAL TEETH.

The Schedule referred to in these Letters Patent and making part of the same.

*To all whom it may concern:*

Be it known that I, JULIUS A. BIDWELL, of Chicago, in the county of Cook and State of Illinois, have invented certain new and useful Improvements in Artificial Teeth; and I do hereby declare the following to be a full, clear, and exact description thereof, which will enable others skilled in the art to which my invention appertains to make and use the same, reference being had to the accompanying drawing forming part of this specification, in which—

Figure 1 is an inverted plan of an upper set of artificial teeth, showing my improvements applied thereto.

Figure 2 is a top plan view of a similar set of teeth, to which my improvements are applied, the construction of the plate differing somewhat from that shown in fig. 1.

Similar letters of reference indicate corresponding parts in the several figures of the drawing.

My invention consists in the arrangement of one or more fine wires along the lingual portion of the teeth, in contact with the plate, by which the teeth are connected together, the wires being finely covered with rubber, and the latter vulcanized.

By this arrangement the plates are not only strengthened, but the wires are covered so that the plates present an unbroken inner surface of rubber.

In the accompanying drawing—

A is the plate of an upper set of artificial teeth, and is composed of vulcanized India rubber, and B are the teeth, secured to the plate in any suitable manner.

The principal objection to the use of vulcanized rubber for dental plates is, that owing to the peculiar shape of the upper plates, they are unable to sustain the violent pressure or strain sometimes incident to their use, and, consequently, crack and break, usually between the parts $x$ $x$, fig. 1.

My invention has for its object to overcome this objection, and render vulcanized rubber plates as efficient as those composed of metal.

For this purpose, I arrange one or more wires, $d$ $d$, along the lingual portion of the plate A, passing alternately above and beneath pins, $e$ $e$, projecting from the inner surface of the teeth B, the wires crossing each other between all the pins, with the exception of those projecting from the incisors C C.

Between these two teeth the wires are arranged parallel to each other, a short distance apart, as shown to afford a wider bearing surface against the teeth, and thereby impart additional strength to the plate at that point. If necessary or desirable, the wires may be arranged parallel to each other at other points along the lingual surface of the teeth, instead of being crossed.

After the wires are applied they are covered with rubber, and the latter vulcanized, so that the under side of the plate presents an unbroken surface of vulcanized rubber, as shown between the molars D D, fig. 1.

In fig. 2 is shown a modification of the plate to which my improved strengthening wires are applied.

In this plate the center D' D' is composed of soft rubber, to furnish a more complete bearing of the plate against the roof of the mouth.

As the plate is weakened by the introduction of the soft rubber, it requires the application of the strengthening wires much more than a plate composed wholly of vulcanized rubber, and I therefore apply my strengthening wires to the lingual portion of the teeth in this plate also.

Having thus described my invention,

What I claim as new, and desire to secure by Letters Patent, is—

The strengthening wires $d$, applied first to the base and teeth of a rubber dental plate, and then covered with vulcanized India rubber, substantially as described for the purpose specified.

JULIUS A. BIDWELL.

Witnesses:
G. H. FROST,
WM. C. FARWELL.